US008510959B2

(12) United States Patent
Whitenight et al.

(10) Patent No.: US 8,510,959 B2
(45) Date of Patent: Aug. 20, 2013

(54) QUICK-CHANGE DISC MOWER KNIVES

(75) Inventors: Donald R. Whitenight, Orangeville, PA (US); Melanie W. Harkcom, New Holland, PA (US)

(73) Assignee: CNH America LLC, New Holland, PA (US)

( * ) Notice: Subject to any disclaimer, the term of this patent is extended or adjusted under 35 U.S.C. 154(b) by 721 days.

(21) Appl. No.: 12/701,636

(22) Filed: Feb. 8, 2010

(65) Prior Publication Data

US 2011/0194885 A1 Aug. 11, 2011

(51) Int. Cl.
*A01D 34/416* (2006.01)
(52) U.S. Cl.
USPC .................................. 30/276; 56/12.7; 56/255
(58) Field of Classification Search
USPC .................... 30/276, 347; 56/12.7 X, 255 X, 56/295, 157, 235, 256, 500, 504, DIG. 20
See application file for complete search history.

(56) References Cited

U.S. PATENT DOCUMENTS

| | | | | |
|---|---|---|---|---|
| 3,320,733 | A * | 5/1967 | Kirk | 56/295 |
| 3,604,189 | A * | 9/1971 | Harer et al. | 56/295 |
| 4,171,724 | A * | 10/1979 | Steele | 172/15 |
| 4,229,933 | A * | 10/1980 | Bernard | 56/295 |
| 4,313,297 | A * | 2/1982 | Maier | 56/295 |
| 4,712,364 | A | 12/1987 | Oxley | |
| 4,815,262 | A | 3/1989 | Koch et al. | |
| 4,996,828 | A * | 3/1991 | Jetzinger | 56/12.7 |
| 5,271,212 | A * | 12/1993 | Anderson | 56/12.7 |
| 5,622,035 | A | 4/1997 | Kondo et al. | |
| 5,996,323 | A | 12/1999 | Campbell et al. | |
| 6,357,215 | B1 * | 3/2002 | Thorne | 56/295 |
| 6,834,486 | B2 * | 12/2004 | Thompson et al. | 56/255 |
| 6,959,530 | B2 * | 11/2005 | Thompson et al. | 56/295 |
| 7,181,897 | B2 * | 2/2007 | Walter et al. | 56/295 |
| 7,490,459 | B2 * | 2/2009 | Thompson et al. | 56/255 |
| 7,703,267 | B2 * | 4/2010 | Tapper | 56/255 |
| 7,743,478 | B2 * | 6/2010 | Thompson et al. | 29/426.1 |
| 7,878,097 | B2 * | 2/2011 | Strader | 83/13 |
| 7,913,401 | B2 * | 3/2011 | Iacona | 30/275.4 |
| 7,966,795 | B2 * | 6/2011 | Thompson et al. | 56/255 |
| 8,069,758 | B2 * | 12/2011 | Zhang et al. | 83/13 |
| 2002/0194829 | A1 | 12/2002 | Petersen et al. | |
| 2004/0177484 | A1 * | 9/2004 | Thompson et al. | 29/402.03 |
| 2005/0016150 | A1 * | 1/2005 | Thompson et al. | 56/295 |
| 2005/0138913 | A1 * | 6/2005 | Thompson et al. | 56/295 |
| 2005/0193706 | A1 * | 9/2005 | Thompson et al. | 56/255 |

(Continued)

FOREIGN PATENT DOCUMENTS

| | | |
|---|---|---|
| EP | 000022588 A1 | 1/1981 |
| EP | 001358786 A1 | 11/2003 |
| GB | 2311453 A | 1/1997 |
| JP | 2002051624 A | 2/2002 |

*Primary Examiner* — Jerry Redman
(74) *Attorney, Agent, or Firm* — Patrick M. Sheldrake

(57) ABSTRACT

A connection apparatus for connecting a knife to a rotary disc cutterhead comprising a mounting stud having a specifically configured head disposed on the rotating cutterhead and a key hole opening on one end of the knife which permits the knife to moved into engagement with the stud and head when the knife is specifically oriented and then retained in place by the stud and head when the knife is moved into a normal operating position. A hand-operated biasing element prevents inadvertent disengagement of the knife from the stud. The keyhole opening and connection stud may also be configured to limit the angular orientation of the knife which will permit disengagement of the knife from the connection apparatus.

14 Claims, 3 Drawing Sheets

(56) References Cited

U.S. PATENT DOCUMENTS

2008/0196255 A1* 8/2008 Strader .......................... 30/276
2010/0205925 A1* 8/2010 Thompson et al. ............. 56/255
2011/0232109 A1* 9/2011 Strader .......................... 30/347
2012/0102762 A1* 5/2012 Cigarini ......................... 30/347

* cited by examiner

QUICK-CHANGE DISC MOWER KNIVES

BACKGROUND OF THE INVENTION

This invention relates generally to machines for severing standing crops from the ground using a plurality of rotatable discs having knives mounted thereon to sever standing crop by an impact action upon rotation of the discs and, more particularly, to disc cutter knives that may be easily removed from the rotatable discs and replaced without the need for tools.

Rotary disc mowers are well known in the agricultural arts and used in the harvest of a variety of standing crops. A typical disc mower cutterbar comprises a plurality of cutterheads spaced along the length of the cutterbar. The cutterheads each typically comprise a rotating cutting disc including diametrically opposed cutting blades (though configurations with three or more blades are known) driven by a drivetrain housed within the cutterbar that receives motive power from the prime mover to which the disc mower is attached. For background information on the structure and operation of some typical disc cutterbars, reference is made to U.S. Pat. No. 5,996,323, issued to Campbell, the descriptive portions thereof being incorporated herein in full by reference.

Cutterbars frequently impact rocks and other obstructions in a field which can damage the knives. Further, knives also become dulled by their interaction with the crop and require periodic removal for sharpening or replacement. Knives were originally secured to the rotating discs using a bolt-and-nut connection. Increasing demands for production efficiency yielded numerous connection designs that enable knives to be removed and replaced more quickly, most retaining the bolt and nut, but no longer necessitating complete removal of the bolt and nut. Still, the known disc cutter knife quick change designs require tools to remove and replace the knives.

It would be advantageous to have a knife for use on a rotary disc cutterhead that could be quickly and conveniently removed and replaced by hand without the need for tools. The quick change connection must reliably retain the knives in position during cutterbar operation to prevent knifes from becoming hazardous projectiles, even as the knives impact standing crop or immovable obstacles in the field.

SUMMARY OF THE INVENTION

Accordingly, the present invention, in any of the embodiments described herein, may provide one or more of the following advantages:

It is an object of the present invention to provide a knife for use on a rotary disc cutterhead that may be removed and reinstalled by hand without the need for tools.

It is a further object of the present invention to provide a knife for use on a rotary disc cutterhead in which centrifugal force of the cutterhead rotation aids in retain the knife connected to the cutterhead.

It is a further object of the present invention to provide a connection apparatus for connecting a knife to a rotary disc cutterhead in which the knife must be specifically oriented before the knife can be removed from the cutterhead.

It is a still further object of the present invention to provide a connection apparatus for connecting a knife for use on a rotary disc cutterhead that incorporates hand operable safety features to prevent inadvertent release of the knife from the disc cutterhead during machine operation.

It is a still further object of the present invention to provide a connection apparatus for connecting a knife to a rotating disc of a rotary disc cutterhead that is durable in construction, inexpensive of manufacture, carefree of maintenance, easily assembled, and simple and effective to use.

These and other objects are achieved in accordance with the instant invention by providing a connection apparatus for connecting a knife to a rotary disc cutterhead comprising a mounting stud having a specifically configured head disposed on the rotating cutterhead and a key hole opening on one end of the knife which permits the knife to moved into engagement with the stud and head when the knife is specifically oriented and then retained in place by the stud and head when the knife is moved into a normal operating position. A hand-operated biasing element prevents inadvertent disengagement of the knife from the stud. The key-hole opening and connection stud may also be configured to limit the angular orientation of the knife which will permit disengagement of the knife from the connection apparatus.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
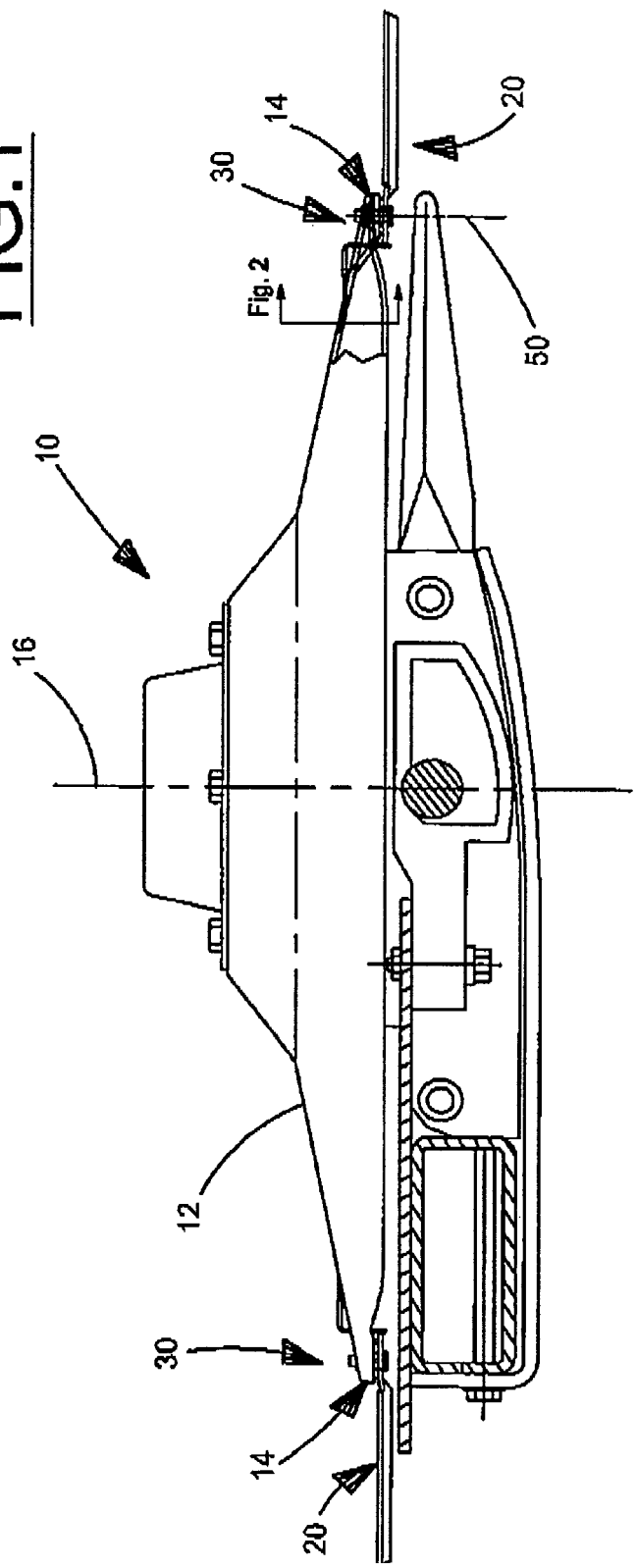
FIG. 1 is a side elevation view of a rotary disc cutterhead of the type on which the present invention is useful.

Referring now to the drawings and particularly to FIG. 1, a rotary disc cutter module 10 of the type on which the present invention finds utility is presented. Disc cutterbars have been utilized in agricultural harvesting implements for many years. A disc cutterbar comprises a plurality of transversely spaced rotary disc cutter modules each being driven for rotation about a generally vertical axis. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference. Each disc cutter module 10 has two or three knives 20 mounted adjacent to the outer periphery 14 of a rotating disc element 12 which are held in place by a knife connection mechanism 30.

Now referring to FIGS. 1 through 7 collectively, the knife connection mechanism 30 comprises a mounting stud 32 which is connected to rotating disc element 12, generally adjacent to the peripheral edge 14 for rotation therewith. One knife connection mechanism 30 is provided for each knife 20 that is connected to the rotating disc element, typically two that are equally spaced apart on the disc element 12. Each mounting stud 32 includes a shank 33 and a head 34 which is secured to the disc element by a nut 36 or equivalent. The stud 32 is aligned on pivot axis 50 which is aligned generally parallel to the axis of rotation 16 of the rotating disc element 12. The mounting studs remain affixed to the disc element 12 during the knife changeout process, thus eliminating one potential need for tools. Each knife 20 includes a keyhole-shaped aperture 22 adjacent the interior end 21 which is specifically shaped to interact with the connection mechanism 30. Aperture 22 comprises two interconnected elongate oval slot-like openings having a first zone 23 and a second zone 24. The first zone 23 is disposed adjacent to interior end 21 and sized to be slightly larger than the diameter of the shank 33 by an amount to allow pivotal movement yet retain the knife 20 in a generally fixed radial position. The first zone 23 is also smaller than the diameter of head 34 so that the knife 20 is permitted only slight movement axially along the shank 33 but captured by contact with the head 34. The second zone 24 is displaced slightly from the first zone 23 toward the free end 28 of the knife and sized to be slightly larger than the diameter of the head 34 so that the knife 20 can be engaged on the mounting stud 32. A spring structure 40 connected to the rotating disc element 12 is provided to urge into and maintain knife 20 in the proper position.

Figure 2:
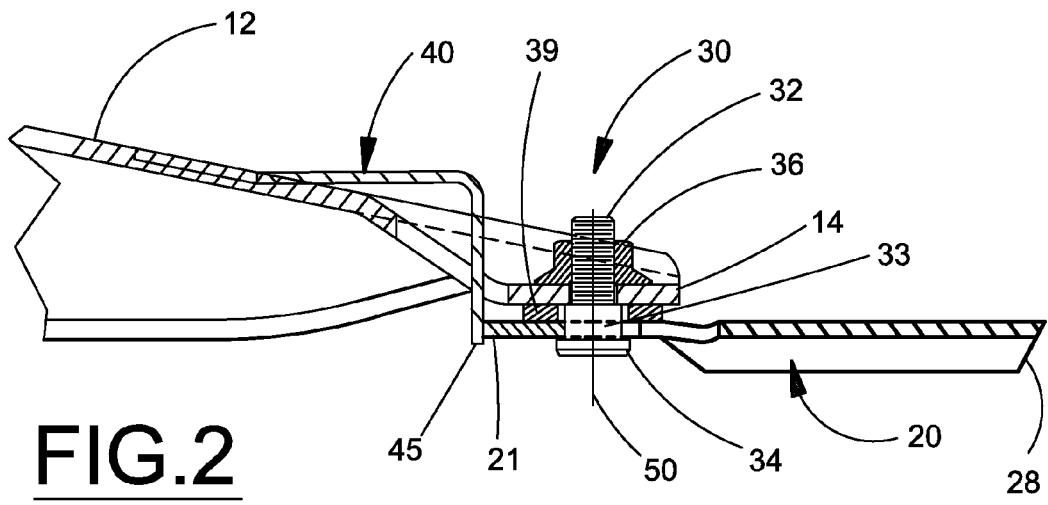
FIG. 2 is a partial side view of the cutterhead of FIG. 1 showing one embodiment of the present invention wherein a knife connection mechanism is shown positioned as it would be during normal cutterhead operation.

FIG. 2 shows the knife connection mechanism 30 as it would be aligned when the knife 20 is in the normally operating position. In this position, the first zone 23 of aperture 22 is engaged with shank 33. Centrifugal force on the knife 20 as it is rotated by the rotating disc element 12 urges knife 20 outwardly thereby keeping the first zone 23 in engagement with the shank 33. Additional retention capability is provided by generally L-shaped biasing spring 40, preferably a flat spring having a first leg 42 connected to the rotating disc element 12 and a second leg 44 which interacts with knife 20. In the preferred embodiment, the second leg 44 is normally aligned to be generally perpendicular to the axis of the knife 20 and extends sufficiently so that the interior end 21 of knife 20 abuts the surface of the spring 40 on the second leg 44 and the second leg extends downwardly to a position at least adjacent to the head 34. The interior end 21 of the knife features a circular contour centered about the operating axis 52 of knife 20 that allows the knife to pivot about the shank 33 while maintaining consistent contact pressure with the surface of the second leg 44.

As the axial length of shank 33 is slightly greater than the thickness of knife 20 to provide ease of knife movement during installation and removal, a spacer 39 is provided to fill the gap between the knife and the base of the peripheral edge 14 at which point the stud 32 connects. Spacer 39 prevents unintentional movement of knife 20 and aids in maintaining the pivot avis of the knife about the stud 32 aligned with the pivot axis of the stud. In one embodiment, spacer 39 is compressible in the direction of the pivot axis to further improve the manual installation characteristics of the knife retention mechanism. One embodiment having this characteristic is a spring washer which would maintain knife 20 firmly engaged against head 34 when in the installed position, thereby maintaining the path of knife 20 during rotation generally planar.

Figure 3:
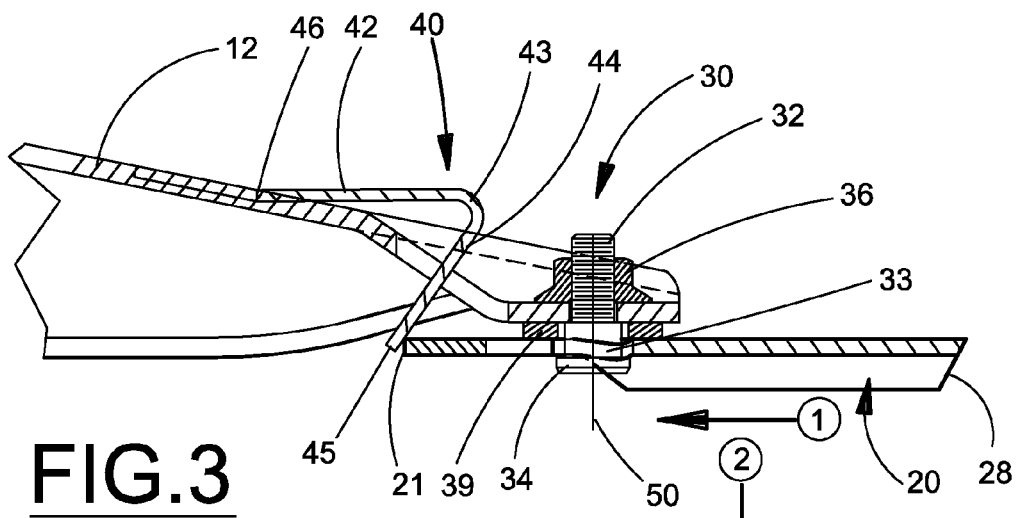
FIG. 3 is a partial side view of the cutterhead of FIG. 1 showing one embodiment of the present invention wherein the knife connection mechanism is shown as it would be positioned as the knife is being removed.

In FIG. 3, knife 20 is repositioned as it would be during removal from the rotating disc element 12. Knife 20 is first moved inwardly, in the direction of arrow (1). This movement repositions aperture 22 such that second zone 24 is centered about shank 33. The inward movement must overcome the spring force of biasing spring 40. Interior end 21 of knife 20 is forced against the second leg 44, causing spring 40 to deflect as shown, bending at apex 43. The force necessary to deflect biasing spring 40 exceeds that which would normally be applied by the knife 20 during operation, such as when the knife 20 impact a rock or similar immovable object, but is not so excessive that a normal operator cannot force the knife inwardly to remove the knife from the connection mechanism 30. Once the knife 20 is repositioned so that the second zone removal axis 51 is aligned with the pivot axis 50, the operator then may move the knife 20 in a downward direction, shown as directional arrow (2) to disengage the knife from the knife connection mechanism 30.

Figure 4:
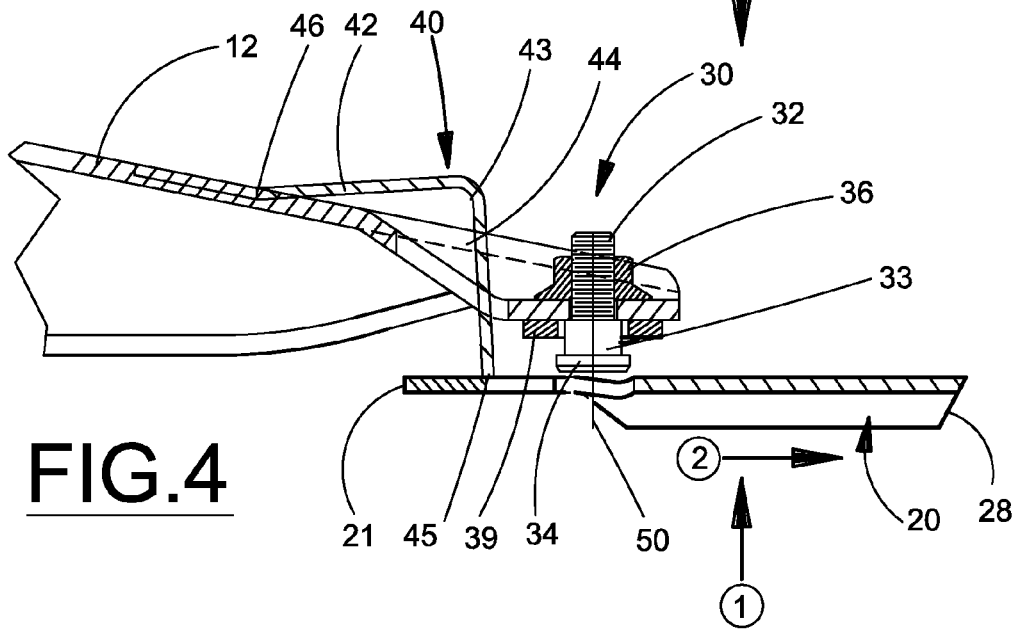
FIG. 4 showing one embodiment of the present invention wherein the knife connection mechanism is shown as it would be positioned as the knife is being installed.

FIG. 4 shows the knife 20 in an intermediate position during the knife installation process. Knife 20 is positioned so that the second zone removal axis 51 is aligned with the pivot axis 50 with the knife 20 positioned below the head 34. As knife 20 is moved vertically upward, shown as direction arrow (1), the upper surface of knife 20 contacts the free end 45 of spring 40 causing the spring 40 to deflect upward until the aperture 22 is positioned above head 34. The knife 20 is then moved outwardly, show as direction arrow (2) until the operating axis 52 of the first zone 23 is aligned with the shank pivot axis 50. As the interior end 21 of knife 20 moves outwardly, the free end 45 of spring 40 is allowed to move downwardly so that the interior end 21 is restrained by contact with the surface of second leg 44, the position shown in FIG. 2.

All movements necessary to remove and install a knife from the disc cutter rotational element may be effected by hand, without the need for additional tools. Removal of the knife from the stud 32 requires movement in a direction opposite to the centrifugal force occurring during operation. Further, spring 40 must be deflected in order to re-position the knife 20 inwardly for removal from the stud 32, thus providing additional safeguards against unintentional release of the knife 20 from the connection mechanism 30. Still further safeguards against unintentional release of knife 20 from connection mechanism 30 may be obtained by configuring the second portion 24 of aperture 24 and the outer periphery of head 34 so that the knife will move downwardly over head 34 in a limited number of angular positions of knife 20 relative to the rotating element of the disc cutter. As the zones 23, 24 of aperture 22 and the head 34 are preferably circular in form, altering the shape of the head and/or periphery of second zone 24 will reduce the permissible orientations at which the knife 20 can be disengaged from the stud 32. In one alternate embodiment, the head 34 retains a conventional hexagonal shape common to fasteners and bolting. The second zone 24 is then configured with a similar hexagonal shape to limit the number of knife orientations that would allow the second zone 24 of the aperture 22 to slip of over the head 34.

Figure 5:
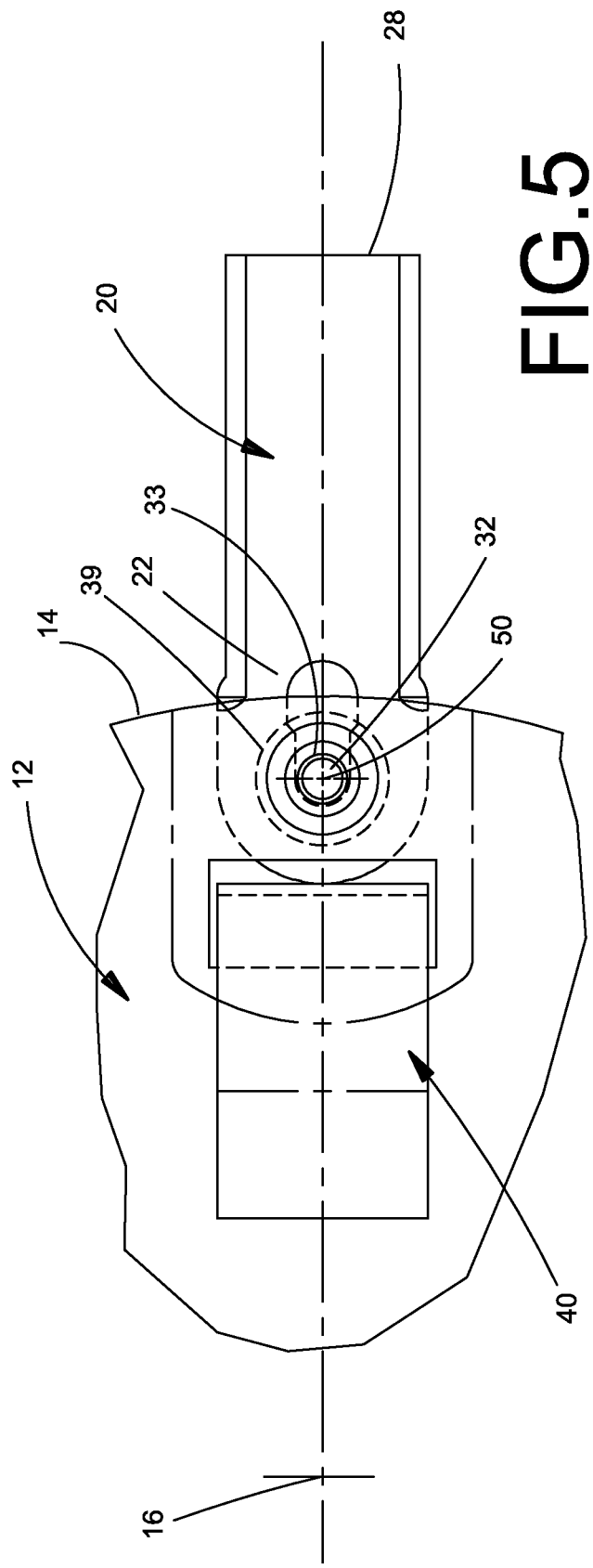
FIG. 5 is a partial plan view of the knife connection mechanism shown in the normal operating position.
Figure 7:
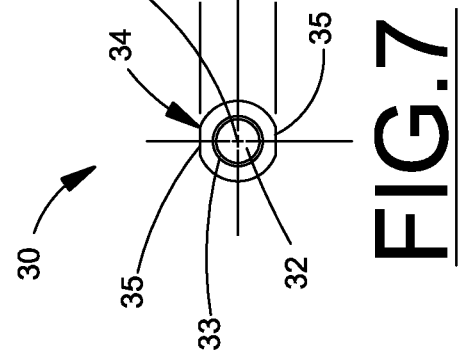
FIG. 7 is a plan view of the connection mechanism showing one embodiment of the connector stud having a head configuration to limit permissible knife orientations for removal and installation.

Finally, referring specifically to FIGS. 5, through 7, the relationship between aperture 22, connection stud 32, and biasing spring 40 are shown. In FIG. 5, knife 20 is shown interfacing with the connector stud 32 as during operation of the disc cutter. Knife 20 is positioned so that operating axis 52 and pivot axis 50 are coincident. Inner end 21 is adjacent to biasing spring 40 which urges knife 20 outwardly so that the interior end of the first zone 23 is in contact with the shank portion 33 of the connection stud 32. In order to enable pivoting of the knife 20 about the connection stud, one embodiment of the inner end 21 includes a constant radius curvature which interacts with spring 40 so that the spring force applied on the knife remains generally constant as the knife pivots. In another embodiment, the inner end 21 may be specifically shaped so that the bias spring force varies with the pivotal position of the knife 20 thereby biasing not only the inner/outer position of the knife, but also the pivotal position of the knife. Such additional biasing would augment the centrifugal force is useful for returning the knife to a desired position after contact with an obstacle on the ground.

Figure 6:
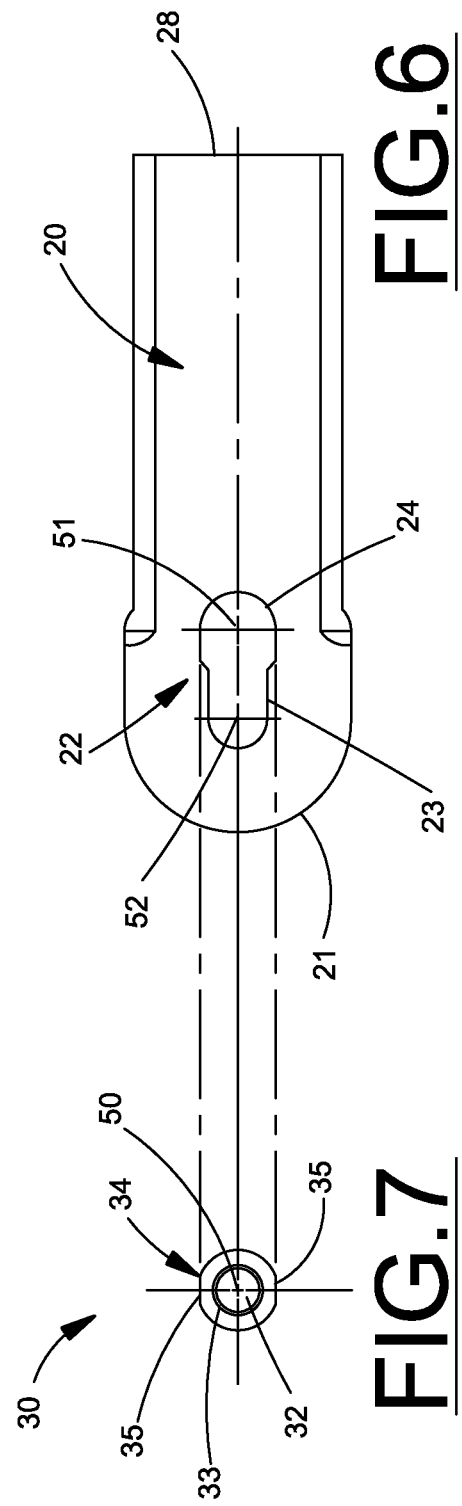
FIG. 6 is a view of the knife having an aperture that is part of the knife connection mechanism.

FIGS. 6 and 7 show the relationship between the head 34 configuration relative to the second zone 24 configuration which serves to limit the permissible pivotal positions for which knife 20 can be removed from the connection stud 32. One embodiment presented in FIG. 7 incorporates a pair of opposing flats 35 formed on the generally circular periphery of head 34. Flats 35 are spaced apart approximately, but just smaller than the diameter distance of second zone 24. Removal of the knife 20 requires that flats 35 be aligned with the sides of second zone 24 in order for the head to pass through the aperture. Thus, knife 20 must be pivotally positioned to one of two positions (180 degrees apart) in order to remove the knife. Other configurations are possible which limit the pivotal position of the knife for which removal is possible. Such limitations decrease the likelihood that a knife may inadvertently become disconnected from the disc cutter.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A mechanism for removably attaching a knife to a rotary disc used on a disc cutterbar on an agricultural mower comprising:
    a disc head configured for rotation about an operating axis, said disc head having an outer portion;
    an elongate retention mechanism connected to said outer portion and oriented on a pivot axis generally parallel to said operating axis, said retention mechanism having a shank portion and a head portion; and
    an elongate and generally planar knife having opposing inner and outer ends, a planar thickness, and an aperture penetrating said planar thickness of said knife and disposed adjacent to said inner end, said aperture further comprising a first zone and a second zone, said aperture configured to engage said shank portion in a manner to locate said knife in a first position when engaging said first zone and a second position when engaging said second zone, said first zone disposed outwardly of said second zone and configured to allow passage therethrough of said head portion, said second zone configured to engage said shank portion of said mounting structure and prevent passage therethrough of said head portion;
    a biasing element connected to said disc, said biasing element configured to urge said knife outwardly from the operating axis into said second position.

2. The mechanism of claim 1, wherein said head portion is configured to interact with said first portion in a manner to limit permissible angular orientations of said knife relative to said head for said head to pass through said first portion.

3. The mechanism of claim 2, wherein said permissible angular orientations are limited to one.

4. The mechanism of claim 1, wherein a force applied by the biasing element is configured to vary with the pivotal position of the knife.

5. The mechanism of claim 1, wherein said biasing element is a spring.

6. The mechanism of claim 5, wherein said inner end of said knife interacts with said spring when in said second position and said inner end is configured to permit pivotal movement of said knife about said pivot axis while said knife is in said second position.

7. The mechanism of claim 6, wherein said inner end is configured to interact with said spring to bias the pivotal orientation of said knife relative to said disc head to a predetermined orientation.

8. A mechanism for removably attaching a knife to a rotary cutterhead used in an agricultural disc cutterbar, the mechanism comprising:
    a rotatable disc element configured for rotation about an axis of rotation, said rotatable disc element having an outer portion;
    an elongate retention mechanism connected to said outer portion and oriented on a pivot axis generally parallel to said operating axis, said retention mechanism having a shank portion and a head portion; and
    an elongate and generally planar knife having opposing inner and outer ends, a planar thickness, and an aperture penetrating said planar thickness of said knife and disposed adjacent to said inner end, said aperture further comprising a first zone and a second zone, said aperture configured to engage said shank portion in a manner to locate said knife in a first position when engaging said first zone and a second position when engaging said second zone, said first zone disposed outwardly of said second zone and configured to allow passage therethrough of said head portion, said second zone configured to engage said shank portion of said mounting structure and prevent passage therethrough of said head portion
    a biasing element connected to said disc element, said biasing element configured to apply a force to the knife along the length of the knife configure to urge the knife toward the second position from the first position.

9. The mechanism of claim 8, wherein the biasing element is positioned such that the force is applied on the inner end of the knife.

10. The mechanism of claim 9, wherein the inner end of the knife is shaped such that force applied on the knife remains generally constant as the knife pivots.

11. The mechanism of claim 8, wherein said biasing element is an elongate spring connected at one end to said disc element and interacting with said inner end at a position displaced from the end connected to said disc element.

12. The mechanism of claim 11, wherein said head is configured to interact with said first portion in a manner to limit permissible angular orientations of said knife relative to said head for said head to pass through said first portion.

13. The mechanism of claim 12, wherein said permissible angular orientations are limited to one.

14. The mechanism of claim 13, wherein said inner end is configured to interact with said spring to bias the pivotal orientation of said knife relative to said disc head to a predetermined orientation.

\* \* \* \* \*